United States Patent Office 3,170,922
Patented Feb. 23, 1965

3,170,922
17-OXYGENATED 2β,19-EPOXY-5α-ANDROSTAN-3α-OLS, ETHERS AND ESTERS THEREOF
Raymond E. Counsell, Skokie, and Paul D. Klimstra, Northbrook, Ill., assignors to G. D. Searle & Co., Chicago, Ill., a corporation of Delaware
No Drawing. Filed July 15, 1963, Ser. No. 295,247
15 Claims. (Cl. 260—239.55)

The invention herein described relates to 2β,19-epoxy steroidal derivatives further characterized by oxygenated functions at the 3 and 17 positions and, more particularly, to 17-oxygenated 2β,19-epoxy-5α-androstan-3α-ols and the corresponding ethers and esters. Those compounds can be represented by the structural formula

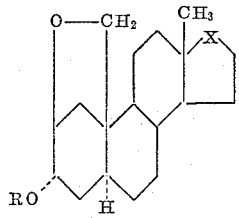

wherein R can be hydrogen, a lower alkanoyl or lower alkyl radical and X represents a carbonyl or

radical, Y indicating hydrogen or a lower alkyl, lower alkenyl, or lower alkynyl group.

Examples of the lower alkanoyl radicals symbolized by R in the foregoing structural representation are acetyl, propionyl, butyryl, valeryl, caproyl, and the corresponding branched-chain isomers.

The lower alkyl, lower alkenyl, and lower alkynyl radicals represented by Y contain less than 8 carbon atoms and are typified by methyl, ethyl, isopropyl, secondary-butyl, tertiary-amyl, heptyl, vinyl, propenyl, allyl, pentenyl, heptenyl, ethynl, propynyl, butynyl, heptnl, and the corresponding branched-chain groups isomeric therewith.

The compounds of the present invention are useful in view of their valuable pharmacological properties. They are hypocholesterolemic agents, for example, in view of their ability to effect a decrease in blood plasma cholesterol concentration. In addition, they display hormonal and anti-hormonal properties as is evidenced by their anabolic, androgenic, and estrogen-inhibitory properties.

A process suitable for the manufacture of the instant compounds involves the oxidation of starting materials represented by the structural formula

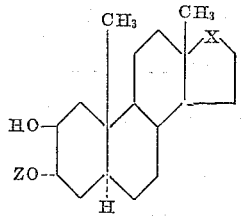

wherein X represents a carbonyl or

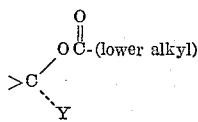

radical, Y being hydrogen or a lower alkyl, lower alkenyl, lower alkynyl radical, and Z is a lower alkanoyl or lower alkyl group. These materials are conveniently obtained by reaction of the corresponding 2β,3β-epoxides with a lower alkanoic acid. Typically 2β,3β-epoxy-5α-androstan-17-one is heated with glacial acetic acid to afford 3α-acetoxy-2β-hydroxy-5α-androstan-17-one. Similarly, the reaction of that 2β,3β-epoxy compound with methanol yields 2β-hydroxy-3α-methoxy-5α-androstan-17-one. The oxidation process utilizing these 2β-hydroxy substances requires the use of a reagent such as lead tetraacetate, lead tetraacetate with iodine, silver acetate with iodine, and mercuric acetate with iodine. The process is preferably conducted at the reflux temperature of the particular solvent selected, which may be an inert non-polar organic solvent such as carbon tetrachloride, chloroform, methylene chloride, benzene, toluene, etc. A specific example of that process is the reaction of 3α-acetoxy-2β-hydroxy-5α-androstan-17-one with lead tetraacetate and iodine in carbon tetrachloride, resulting in 3α-acetoxy-2β,19-epoxy-5α-androstan-17-one.

Reduction of the 17-keto compounds of this invention provides an alternate route to the corresponding 17β-hydroxy derivatives. The aforementioned 3α-acetoxy-2β,19-epoxy-5α-androstan-17-one, for example, is allowed to react with sodium borohydride in methanol at room temperature to yield 2β,19-epoxy-5α-androstane-3α,17β-diol 3-acetate.

The 3α-hydroxy compounds of this invention can be produced by hydrolysis of the corresponding 3α-alkanoyl-oxy compounds in a suitable alkaline medium. The reaction of 2β,19-epoxy-5α-androstane-3α,17β-diol 3-acetate, for example, in methanol with an aqueous solution of an inorganic alkali such as 20% aqueous sodium hydroxide, affords the corresponding free diol.

When the instant 17-keto compounds are contacted with a suitable organometallic reagent, the instant 17α-(hydrocarbon-substituted)-17β-ols are produced. The reaction of lithium acetylide, for example, with the aforementioned 3α-acetoxy-2β,19-epoxy-5α-androstan-17-one affords 2β,19-epoxy-17α-ethynyl-5α-androstane-3α,17β-diol, while that 17-keto substance yields 2β,19-epoxy-17α-methyl-5α-androstane-3α,17β-diol when contacted with methyl magnesium bromide in a mixture of tetrahydrofuran and ether.

The instant 17α-alkynyl substances can be converted to the corresponding 17α-alkyl derivatives in which the alkyl group contains more than one carbon atom. The aforementioned 2β,19-epoxy-17α-ethynyl-5α-androstane-3α,17β-diol, for example, is hydrogenated in ethanol solution, utilizing 5% palladium-on-carbon as the catalyst, in order to produce the 17α-ethyl derivative.

An alternate method for the manufacture of the instant 17α-alkenyl compounds involves partial catalytic hydrogenation of the aforementioned 17α-alkynyl substances. As a specific example, 2β,19-epoxy-17α-ethynyl-5α-androstane-3α,17β-diol dissolved in a suitable organic amine such as pyridine, is stirred in a hydrogen atmosphere in the presence of a 5% palladium-on-carbon catalyst to produce 2β,19-epoxy-17α-vinyl-5α-androstane-3α,17β-diol.

The 3α-(lower alkanoyl)oxy compounds of this invention can be produced also by esterification of the parent 3α-ols. Thus, 17α-methyl-2β,19-epoxy-5α-androstane-3α,17β-diol is contacted with acetic anhydride and pyridine to afford the 3α-acetoxy derivative.

An alternate method for the manufacture of the instant 3α-(lower alkoxy) compounds involves alkylation of the corresponding 3α-hydroxy substances. 2β,19-epoxy-3α-hydroxy-5α-androstan-17-one, for example, is allowed to react with methyl iodide in the presence of potassium tertiary-butoxide to yield 2β,19-epoxy-3α-methoxy-5α-androstan-17-one.

The invention will appear more fully from the examples which follow. These examples are given by way of illustration only and are not to be construed as limiting in

EXAMPLE 1

A mixture of 5 parts of 2β,3β-epoxy-5α-androstan-17-one and 130 parts of glacial acetic acid is heated on the steam bath for about 4½ hours, then is allowed to stand at room temperature for about 15 hours. The reaction mixture is poured slowly into a mixture of ice and water, and this aqueous mixture is extracted with ether. The ether solution is washed successively with water and 15% aqueous sodium bicarbonate, then is dried over anyhdrous potassium carbonate containing decolorizing carbon, and is stripped of solvent at reduced pressure. The residue is dissolved in benzene, then is chromatographed on a silica gel column. The column is eluted with 10% ethyl acetate in benzene to afford a fraction which, after recrystallization from acetone-hexane, affords 3α-acetoxy-2β-hydroxy-5α-androstan-17-one, melting at about 190–192°. It is characterized further by an optical rotation of +107.5° in chloroform.

EXAMPLE 2

The substitution of 160 parts of propionic acid for acetic acid in the procedure of Example 1 results in 2β-hydroxy-3α-propionoxy-5α-androstan-17-one.

EXAMPLE 3

To a solution of 3.5 parts of 3α-acetoxy-2β-hydroxy-5α-androstan-17-one in 480 parts of carbon tetrachloride is added 13.3 parts of lead tetraacetate and 5 parts of iodine, and the resulting reaction mixture is stirred at the reflux temperature for about 8 hours, then is kept at room temperature for about 16 hours. The insoluble salts which form are removed by filtration and washed on the filter with methylene chloride. The filtrate is washed twice with 10% aqueous sodium thiosulfate, then with water, and is finally dried over anhydrous sodium sulfate. Distillation of the solvent at reduced pressure affords a solid residue which is recrystallized from acetone-heptane to afford 3α-acetoxy-2β,19-epoxy-5α-androstan-17-one, melting at about 175–180°. A second recrystallization from aqueous acetone affords a sample of the pure material, melting at about 183.5–185° and characterized further by an optical rotation of +87° in chloroform. This compound is represented by the structural formula

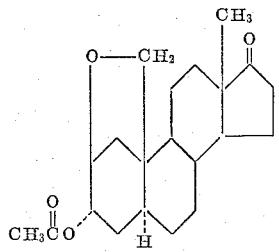

EXAMPLE 4

The substitution of 3.64 parts of 2β-hydroxy-3α-propionoxy-5α-androstan-17-one in the procedure of Example 3 results in 2β,19-epoxy-3α-propionoxy-5α-androstan-17-one of the structural formula.

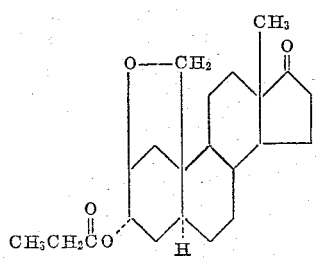

EXAMPLE 5

A mixture of 4 parts of 3α-acetoxy-2β,19-epoxy-5α-androstan-17-one, 2 parts of potassium hydroxide, 78 parts of methanol, and 2 parts of water is heated at the reflux temperature for about one hour, then is cooled and poured slowly into a mixture of ice and water. The precipitate which results is collected by filtration, washed on the filter with water, then recrystallized from acetone to afford pure 2β,19-epoxy-3α-hydroxy-5α-androstan-17-one, melting at about 216–218°. It displays an optical rotation of +90.5° in chloroform and is further characterized by the structural formula

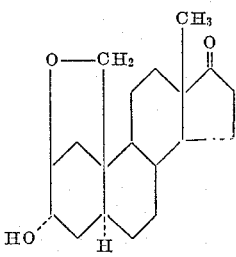

EXAMPLE 6

Method A

To a solution of one part of 3α-acetoxy-2β,19-epoxy-5α-androstan-17-one in 13.3 parts of tetrahydrofuran, in a nitrogen atmosphere, is added, at about 5° with stirring, a solution of 3 parts of lithium tri-(tertiary-butoxy) aluminum hydride in 13.3 parts of tetrahydrofuran. The reaction mixture is stirred for about one hour, during which time the mixture is allowed to warm to room temperature. This solution is then poured into approximately 175 parts by volume of a mixture of ice and 10% aqueous acetic acid, and the precipitate which results is collected by filtration, then is washed on the filter with water and is dried in air. Recrystallization of this solid material from acetone-hexane results in pure 2β,19-epoxy-5α-androstane-3α,17β-diol 3-acetate, melting at about 163.5–165°. It is further characterized by an optical rotation of +26.5° in chloroform and by the structural formula

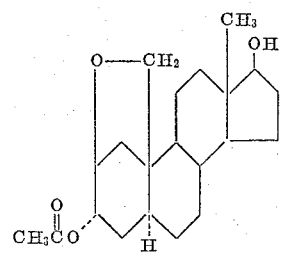

Method B

A mixture of 4 parts of 3α-acetoxy-2β,19-epoxy-5α-androstan-17-one, 2 parts of sodium borohydride, and 80 parts of methanol is kept at room temperature for about 16 hours, and the resulting solution is poured into approximately 50 parts by volume of 20% aqueous hydrochloric acid. The product which precipitates is collected by filtration, washed on the filter with water, then recrystallized twice from aqueous methanol to afford 2β,19-epoxy-5α-androstane-3α,17β-diol 3-acetate, identical with that material prepared according to the procedure of Method A.

EXAMPLE 7

The reduction of 4.16 parts of 2β,19-epoxy-3α-propionoxy-5-androstan-17-one by either of the procedures described in Example 6 affords 2β,19-epoxy-5α-androstane- 3α,17β-diol 3-propionate, represented by the structural formula

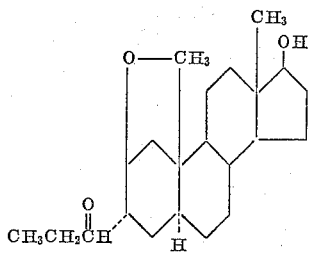

EXAMPLE 8

To a solution of 7.5 parts of 2β,19-epoxy-5α-androstane-3α,17β-diol 3-acetate in 360 parts of methanol is added 50 parts by volume of 20% aqueous sodium hydroxide, and the resulting mixture is heated at the reflux temperature for about one hour. Cooling of this mixture followed by dilution with water results in precipitation of the product which is collected by filtration and recrystallized from methanol to yield pure 2β,19-epoxy-5α-androstane-3α,17β-diol. It displays a melting point of about 252.5–254° and an optical rotation of +22.5° in chloroform. This compound is characterized also by the structural formula

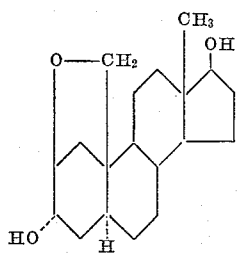

EXAMPLE 9

To a solution of 3 parts of 3α-acetoxy-2β,19-epoxy-5α-androstan-17-one in 54 parts of redistilled tetrahydrofuran containing 42 parts of ether is added, dropwise with stirring, a solution of 42 parts of volume of 3 molar ethereal methyl magnesium bromide. The reaction mixture is heated at the reflux temperature with stirring for about 4 hours, after which time it is cooled to 0–5°, and a solution of 8 parts of ammonium chloride in 60 parts of water is added dropwise with stirring. This aqueous mixture is extracted with chloroform, and the organic extract is washed successively with dilute hydrochloric acid and water. The organic layer is separated, dried over anhydrous sodium sulfate, and distilled to dryness under reduced pressure. The resulting crude product is purified by successive recrystallizations from aqueous ethanol and methanol-ethyl acetate to afford 2β,19-epoxy-17α-methyl-5α-androstane-3α,17β-diol, possessing a melting point of about 222–224° and an optical rotation of +0.5° in ethanol. It is characterized further by the structural formula

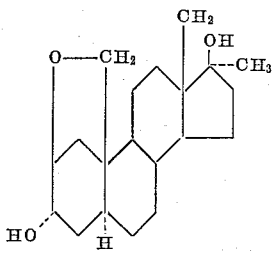

EXAMPLE 10

A solution of 8 parts of a 30% lithium acetylide—70% ethylene diamine complex in 45 parts of tetrahydrofuran is stirred in a nitrogen atmosphere at room temperature while a solution of 3 parts of 3α-acetoxy-2β,19-epoxy-5α-androstan-17-one in 45 parts of tetrahydrofuran is added dropwise over a period of about 30 minutes. The resulting solution is stirred at room temperature for about 2½ hours longer, after which time approximately 0.2 part of saturated aqueous ammonium chloride is added. This mixture is poured into ice and water, then is acidified by the addition of hydrochloric acid. After stirring for several minutes, the precipitate is collected by filtration, washed on the filter with water, and dried in air, then recrystallized from methanol to afford 2β,19-epoxy-17α-ethynyl-5α-androstane-3α,17β-diol, melting at about 295–299° with decomposition. Further purification is effected by another recrystallization from ethanol. This substance is represented by the structural formula

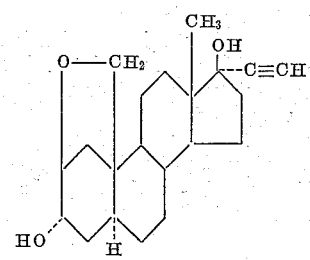

EXAMPLE 11

To a solution of 9.95 parts of 2β,19-epoxy-17α-ethynyl-5α-androstane-3α,17β-diol in 1000 parts of pyridine is added one part of 5% palladium-on-carbon catalyst, and the resulting reaction mixture is stirred in a hydrogen atmosphere at atmospheric pressure and room temperature until one molecular equivalent of hydrogen is absorbed. The catalyst is removed by filtration, and the filtrate is stripped of solvent at reduced pressure to afford an oil which solidifies on standing. Recrystallization of that solid from aqueous methanol affords 2β,19-epoxy-17α-vinyl-5α-androstane-3α,17β-diol monohydrate, melting at about 183.5–185° and displaying an optical rotation of +9° in chloroform. It is further characterized by the structural formula

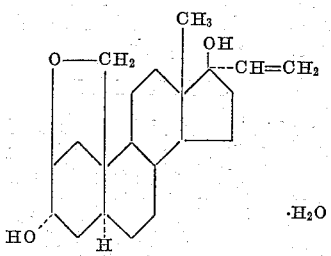

EXAMPLE 12

To a solution of 1.5 parts of 2β,19-epoxy-17α-ethynyl-5α-androstane-3α,17β-diol in 16 parts of ethanol is added 0.15 part of 5% palladium-on-carbon catalyst, and the mixture which results is shaken with hydrogen at atmospheric pressure and room temperature until the absorption of 2 molecular equivalents of hydrogen is completed. Removal of the catalyst by filtration and the solvent by distillation at reduced pressure affords a residue which is recrystallized from aqueous ethanol to afford 2β,19-epoxy-17α-ethyl-5α-androstane-3α,17β-diol. It is represented by the following structural formula

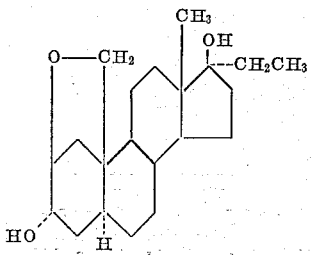

EXAMPLE 13

A solution of 6 parts of 1-butyne in 40 parts of cold ether is added portionwise, over a period of about 30 minutes, to a solution of butyl lithium, prepared from 17.3 parts of 1-bromobutane and 2.2 parts of lithium wire in 27 parts of ether. After the addition is completed, the mixture is stirred for about 90 minutes at 0°, at the end of which time is added a solution of 10.1 parts of 2β,19-epoxy-3α-hydoxy-5α-androstan-17-one in 100 parts of tetrahydrofuran over a period of about 30 minutes. The ether is then removed by distillation, during which operation the volume is maintained essentially constant by the addition of tetrahydrofuran. After the ether has been removed, the resulting reaction mixture is heated at the reflux temperature for about 3 hours, then is poured slowly into cold water. This aqueous mixture is extracted with ether, and the resulting organic solution is washed successively with water and saturated aqueous sodium chloride. Drying over anhydrous sodium sulfate followed by removal of the solvent by distillation at reduced pressure affords 17α-(1-butynyl) - 2β,19-epoxy-5α-androstane-3α,17β-diol of the structural formula

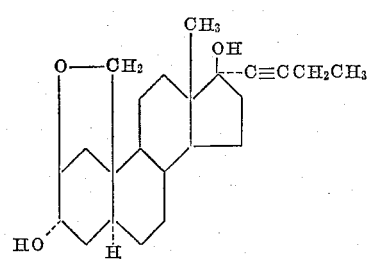

EXAMPLE 14

The substitution of 10.8 parts of 17α-(1-butylyl)-2β,19-epoxy-5α-androstane-3α,17β-diol in the reduction process disclosed in Example 11 affords 17α-(1-butenyl)-2β,19-epoxy-5α-androstane-3α,17β-diol.

EXAMPLE 15

A mixture of 5.4 parts of 2β,19-epoxy-17α-methyl-5α-androstane-3α,17β-diol, 20 parts of acetic anhydride, and 80 parts of pyridine is allowed to stand at room temperature for about 16 hours, then is poured slowly into cold water. The resulting aqueous mixture is extracted with ether, and the ether layer is separated, washed successively with dilute hydrochloric acid and water, then dried over anhydrous sodium sulfate. The solvent is removed by distillation at reduced pressure, and the resulting residue is crystallized from aqueous methanol to afford 2β,19-epoxy-17α-methyl-5α-androstane-3α,17β-diol 3-acetate, characterized by the structural formula

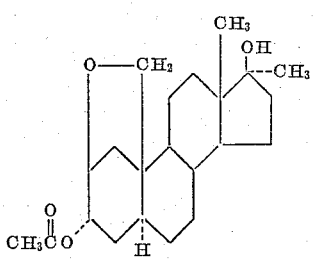

EXAMPLE 16

The acylation of 5.5 parts of 2β,19-epoxy-17α-ethynyl-5α-androstane-3α,17β-diol by the processes described in Example 15 results in 2β,19-epoxy-17α-ethynyl-5α-androstane-3α,17β-diol 3-acetate of the structural formula

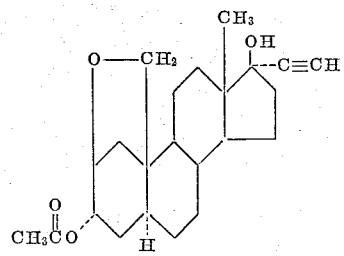

EXAMPLE 17

By substituting 5.6 parts of 2β,19-epoxy-17α-vinyl-5α-androstane-3α,17β-diol and otherwise proceeding according to the processes described in Example 15, 2β,19-epoxy - 17α - vinyl - 5α - androstane - 3α,17β - diol 3-acetate is obtained. It can be represented by the structural formula

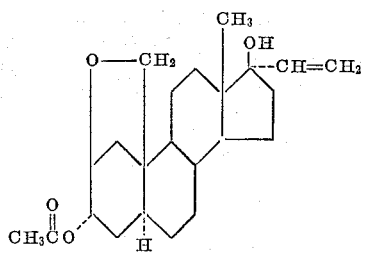

EXAMPLE 18

A solution of 1.5 parts of 2β,3β-epoxy-5α-androstan-17-one in 16 parts of methanol containing 0.1 part of concentrated sulfuric acid is heated at the reflux temperature for about 4 hours, then is poured into approximately 130 parts of a mixture of ice and water. The resulting precipitate is collected by filtration, washed on the filter with water, and dried. Recrystallization of that solid material from acetone-hexane affords 2β-hydroxy-3α-methoxy-5α-androstan-17-one, melting at about 172–173° and displaying an optical rotation of +101° in chloroform.

EXAMPLE 19

Method A

A mixture of 10.5 parts of 2β-hydroxy-3α-methoxy-5α-androstan-17-one, 40 parts of lead tetraacetate, 15 parts of iodine, and 1440 parts of carbon tetrachloride is heated at the reflux temperature for about 8 hours, then is cooled and filtered. The filter cake is washed with carbon tetrachloride, and the filtrate is washed successively with water, 1% aqueous sodium thiosulfate until the iodine color does not reappear, and 5% aqueous sodium bicarbonate. This organic solution is then dried over anhydrous sodium sulfate containing decolorizing carbon and is stripped of solvent at reduced pressure to afford an oily residue. That residue is then chromatographed on a silica gel column to yield 2β,19-epoxy-3α-methoxy-5α-androstan-17-one, which is characterized by infrared absorption maxima at about 3.4, 5.75, 9.1, and 9.3 microns, and by the structural formula

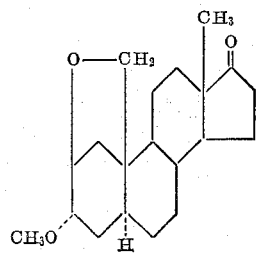

Method B

To a solution of 2.5 parts of 2β,19-epoxy-3α-hydroxy-5α-androstan-17-one in 44 parts of benzene, in a nitrogen atmosphere, is added successively, at room temperature with stirring, 1.5 parts of potassium tertiary-butoxide and 6 parts of methyl iodide. This reaction mixture is stirred at room temperature for about 16 hours, then is filtered to remove the potassium iodide which forms. The filtrate is washed successively with water, 5% aqueous ammonium chloride, and water, then is dried over anhydrous sodium sulfate containing decolorizing carbon. Removal of the solvent by distillation at reduced pressure affords 2β,19-epoxy-3α-methoxy-5α-androstan-17-one, identical with that material described in Method A.

EXAMPLE 20

To a solution of 30 parts by volume of 3 M ethereal methyl magnesium bromide in 35 parts of ether is added, over a period of about 30 minutes with stirring, a solution of 2 parts of 2β,19-epoxy-3α-methoxy-5α-androstan-17-one in 35 parts of dry ether. This reaction mixture is heated at the reflux temperature for about 16 hours, then is cooled and poured into a mixture of ice and water containing sufficient hydrochloric acid for neutralization. This aqueous mixture is extracted with ether, and the ether extract is washed with water, then is dried over anhydrous potassium carbonate containing decolorizing carbon. Removal of the solvent by distillation at reduced pressure affords a glass which is adsorbed on a silica gel chromatographic column. The column is eluted with benzene solutions containing increasing proportions of ethyl acetate. The 15% ethyl acetate in benzene eluate affords, after distillation of the solvent, 2β,19-epoxy - 3α - methoxy - 17α - methyl - 5α - androstan-17β-ol, melting at about 159–161°. It is characterized further by the structural formula

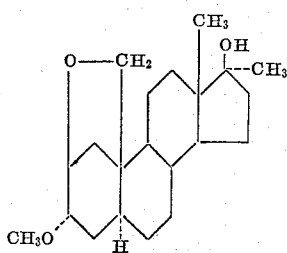

What is claimed is:
1. A compound of the formula

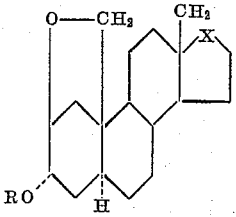

wherein R is selected from the group consisting of hydrogen, methyl, and

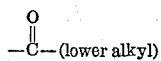

radicals, and X is a member of the class of radicals consisting of carbonyl, β-hydroxymethylene, and those represented by the formulas

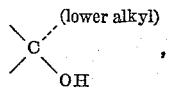 , 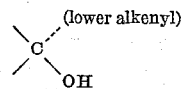

and

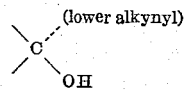

2. 2β,19-epoxy-3α-methoxy-5α-androstan-17-one.
3. 2β,19 - epoxy-3α-methoxy-17α-methyl-5α-androstan-17β-ol.
4. 2β,19-epoxy-3α-hydroxy-5α-androstan-17-one.
5. 2β,19-epoxy-5α-androstane-3α,17β-diol.
6. A compound of the formula

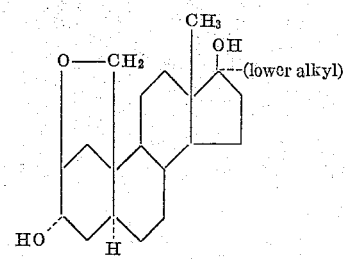

7. 2β,19-epoxy-17α-methyl - 5α - androstane - 3α,17β-diol.
8. A compound of the formula

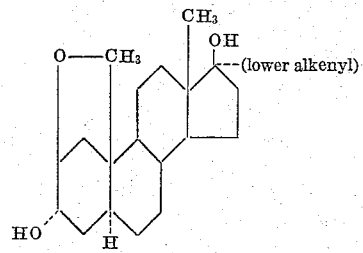

9. 2β,19-epoxy-17α-vinyl-5α-androstane-3α,17β-diol.
10. A compound of the formula

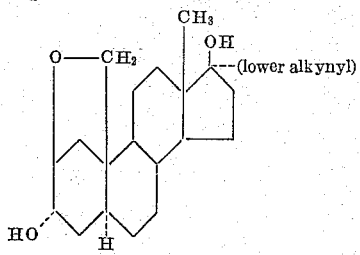

11. 2β,19-epoxy-17α-ethynyl - 5α - androstane-3α,17β-diol.
12. A compound of the formula

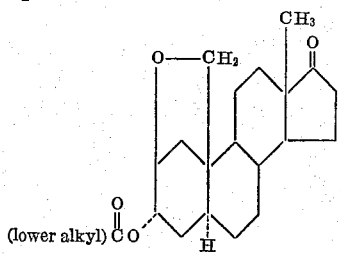

13. 3α-acetoxy-2β,19-epoxy-5α-androstan-17-one.
14. A compound of the formula

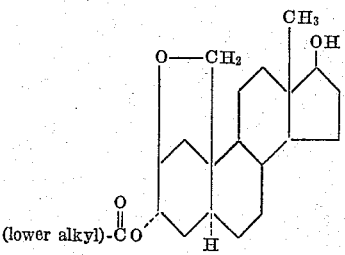

15. 2β,19-epoxy-5α-androstane-3α,17β-diol 3-acetate.

References Cited in the file of this patent

Heusler et al.: "Helv. Chim. Acta.," vol. 45, No. 7, December 1962, pp. 2575–2590.

Kwok et al.: "J. Oreg. Chem.," vol. 28, No. 2, February 1963, pp. 423–427.